Patented Dec. 18, 1951

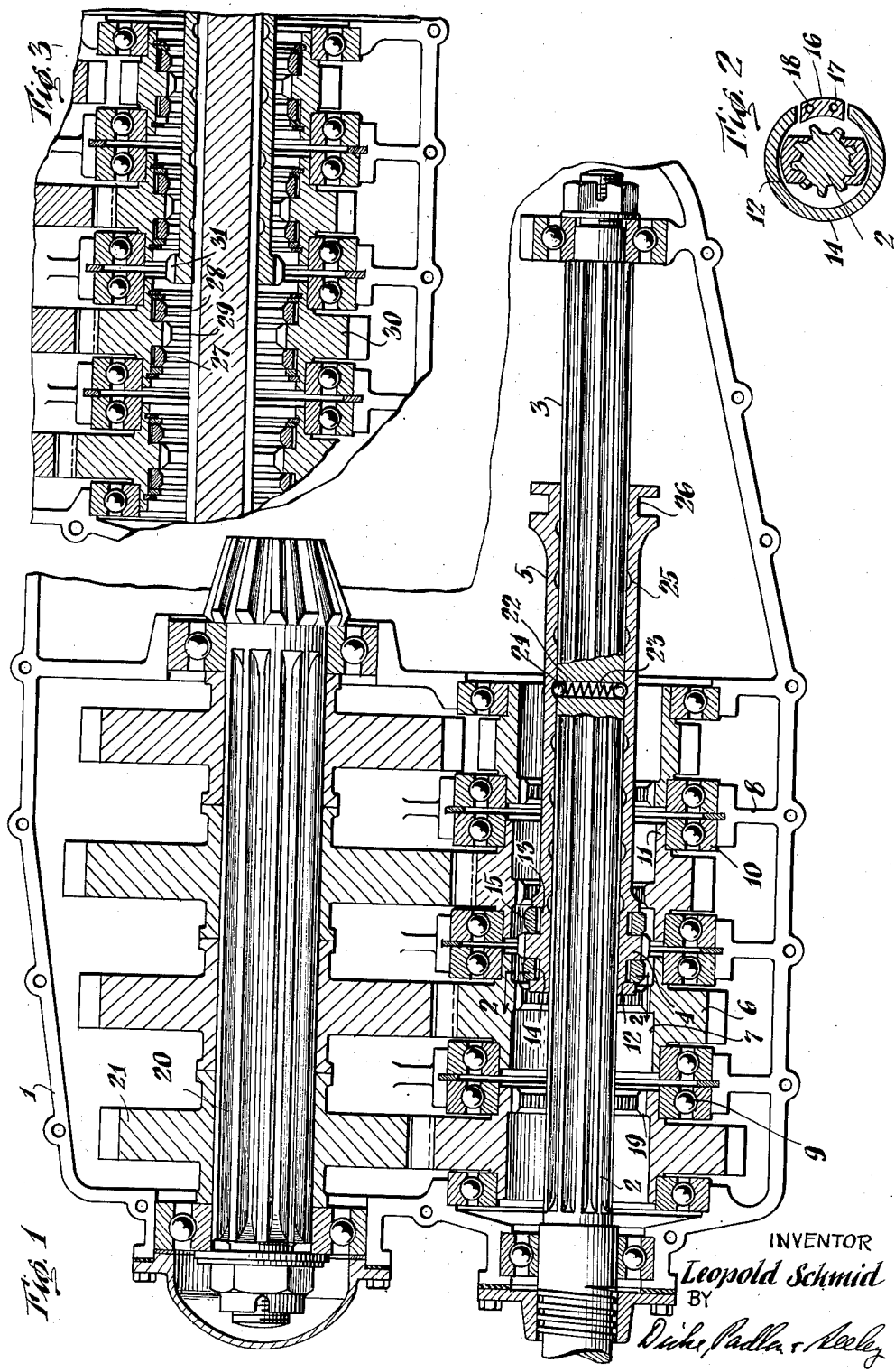

2,578,747

UNITED STATES PATENT OFFICE 2,578,747

SYNCHRONIZING DEVICE

Leopold Schmid, Gmund, Karnten, Austria

Application March 4, 1948, Serial No. 12,946
In Austria March 13, 1947

6 Claims. (Cl. 192—53)

This invention relates to synchronizing device.

An object of this invention is to provide an improved transmission of the above type constructed and arranged to accomplish the synchronizing operation in less time than has heretofore been customary.

A further object is to provide such a transmission with an improved synchronizing device which accomplishes the synchronizing operation without having to vary the angular velocity of heavy parts.

A further object is to provide a constant-mesh transmission with a synchonizing device of such construction and arrangement that the synchronizing surfaces are engaged only during the gear-shifting operation and are disengaged upon completion thereof.

A further object is to provide a relatively simple inexpensive synchronizing device for transmissions of the above type.

Other objects will become apparent from the following description taken in connection with the attached drawings showing two illustrative embodiments of the invention and wherein Fig. 1 is a longitudinal section through a three-speed and reverse transmission having a synchronizing mechanism constructed in accordance with one embodiment of this invention. Fig. 2 is a transverse sectional view on the line 2—2 of Fig. 1, and Fig. 3 is a partial view, similar to Fig. 1, showing another modification of the invention.

In the present invention a gear-shifting or actuating member forms one half of a jaw clutch and consists of a slidable sleeve splined to the transmission power shaft and provided with a toothed periphery, which is disposed between annular synchronizing members, the arrangement being such that, when shifting gears, first a synchronizing member and then the clutch teeth are brought into engagement with correspondingly toothed bores of the transmission gears which form the other half of the jaw clutch for connecting an associated gear to the power shaft. By this means synchronized rotation of the shaft and the respective gears is obtained without providing a synchronizing mechanism on each individual speed gear. However, it is also possible, by sacrificing this advantage, to provide the sliding sleeve with clutch teeth only, in which case synchronizing members are provided on each speed gear so that, on shifting gears, the teeth on the sleeve first engage such members and then the clutch teeth formed in the bore of the gear. In both constructions the weight of the transmission parts to be accelerated or retarded during gear shifting is reduced to a minimum.

A further considerable advantage is that the gear shift is brought about simply by the axial displacement of the sleeve, whereby the selective shifting of the gears wtih movements of an operating lever in different directions is done away with. This advantage is especially noticeable in the case of rear engines.

Tests have shown that the shortest time taken for gear changing hitherto with synchronizing arrangements, namely 0.4 second, is reduced to from 0.1 to 0.2 second.

Referring to the drawings, in the casing 1 is the suitably supported driving shaft 2 provided, for instance, with a splined section 3. On this shaft is mounted so as to be longitudinally slidable thereon and coupled to the shaft, so as to turn with it, a jaw clutch member 4 which in the example shown is made in one piece with and actuating, sliding sleeve or driving member 5.

Each individual speed gear 6 has a central bore 7 and is supported in anti-friction bearings 9 in ribs 8 of the casing, which extend between the gears. The bearings are mounted between openings 10 in the casing ribs and the hub bodies 11 of the gears.

The jaw clutch member 4 has friction surfaces which as shown in Fig. 1 consist of synchronizing members arranged on each side of the clutch member proper located in grooves 12 and 13. They consist of rings 14, 15 which are slotted and radially yieldable. The rings 14, 15 are secured against turning b ya part 16 which has the form of an annulus sector and is fixed by means of pins 17, 18 to the actuating or driving member 5. In order to enable the synchronizing rings to spring freely, clearance is provided between the part 16 and the ring ends.

Each of the gears 6 has internal jaw clutch teeth 19 which during the gear-changing operation first coact with one of the svnchronizing members, so that both act as friction surfaces and thereby as a synchronizing coupling. By this means the velocity of the associated gear is synchronized with that of the clutch member 4, permitting engagement of the clutch member with the clutch teeth 19 of the gear. In order still further to shorten the operative motions for changing the speeds the internal clutch teeth 19 can be located at the axial edge of the gear in the internal bore.

On the driven shaft 20 are keyed the gears 21 which are in permanent mesh with the gears 6. In order to hold the actuating member in either operative or idle running positions, the driving shaft 2 has a transverse bore 22 with two detent balls 24 forced apart by a spring 23 for axially securing the sliding sleeve by means of the recesses 25.

The transmission has very few parts, is therefore cheap to manufacture and takes up very little space. When changing to any of the speeds, the only parts the speed of revolution of which must be altered, are the clutch disk (not shown) on the driving shaft, the driving shaft 2 and the actuating member 4 with the sliding sleeve 5. The transmission thus has the smallest synchronizing masses which are at all possible. Gear shifting is effected only by motion parallel to the driving shaft, through the engagement of a shifting fork in the groove 26 of the sliding sleeve 5.

Between each operative position is an idle running position. In Fig. 1 the actuating member is shown in one of these idle running positions. A main idle running position may be provided between two speeds through allowing a greater distance between two successive speed gears and will preferably be placed between the forward and reverse gears.

A modified construction of the invention is shown in Fig. 3 in which synchronizing rings 27 and 28 are provided on both sides of the internal clutch teeth 29 of each individual speed gear 30. In this instance there are no synchronizing members on the actuating member 31. During the gear-shifting operation the clutch teeth on the actuating member 31 frictionally engage a synchronizing ring 27 or 28 before meshing with the clutch teeth 29 on the gear 30 resulting in synchronized rotation of the gear and the actuating member prior to engagement of the clutch teeth.

According to the invention it is, of course, also possible to provide for some, only, of the gears to be synchronized. Instead of there being only one synchronizing member on each side of the internal teeth of the gear or actuating member several synchronizing members may be provided on each side. Two or more actuating members may be provided each of which actuates only some of the speeds. Other variations will be obvious.

The invention is not intended to be limited to the two forms shown, which are to be understood as illustrative, only, and not as limiting, as various changes in construction and arrangement may be made, all coming within the scope of the following claims.

What is claimed is:

1. In a constant mesh variable speed power transmission mechanism, a rotatable driving member mounted for axial sliding movement, a series of rotatable selectively driven members mounted coaxially with said driving member and spaced from each other in an axial direction, the driving member being formed with outwardly extending driving teeth and each of the driven members being formed with inwardly extending teeth complementary to said outwardly extending teeth on the driving member, the inner ends of which teeth on the driven members being concentric with the axis of the driving member whereby the driving member may engage with any one of the driven members to rotate the same, together with two friction members mounted on the driving member, one on each side of the teeth thereon, said friction members having an outer surface generally concentric with the axes of the driving and driven members and slightly larger in diameter than the ends of the inwardly extending teeth on the driven members, whereby, as the driving member is shifted axially past any of the driven members in the series, one of said friction members will first engage with the ends of the teeth on the one of driven members to synchronize the speed of the driving member and then the teeth on the driving member will positively engage the teeth on said driven member.

2. In a constant-mesh variable speed transmission mechanism, a drive shaft and transmission gear means provided with internal clutch teeth for different speeds and adapted to be operated by said shaft, a cooperating clutch member splined to said shaft for movement longitudinally thereof past any of the means, said clutch member having clutch teeth adapted to be moved into and out of mesh with the selected clutch teeth on said gear means, a radially resilient synchronizing ring mounted on said member on each side of the clutch teeth of the cooperating clutch member, each ring having a friction surface for yieldingly engaging a surface on the clutch teeth of said other means upon movement of said clutch member longitudinally of said shaft, to frictionally precouple said means and synchronize the angular velocities thereof, whereby said clutch member can be moved into clutching engagement with said gear means from either side thereof longitudinally of said shaft.

3. In a geared power transmission mechanism a drive shaft, a plurality of spaced transmission gears forming a series for imparting different speeds, each gear having internal teeth adapted to receive their speed from the drive shaft, a cooperating clutch member mounted on the shaft and longitudinally movable thereon, said clutch member being concentric with the gears and being adapted selectively to move telescopically into and out of mesh with the internal teeth on the transmission gears, a radially resilient annular synchronizing member mounted on either side of said clutch member, having a friction surface for yieldingly preengaging a surface on the internal teeth of the selected transmission gear when said clutch member is moved on said drive shaft, and means fixing the synchronizing member to the clutch member for resisting relative rotation of its ring thereon so that upon movement of said clutch member longitudinally of said shaft said synchronizing ring frictionally precouples said members to synchronize the angular velocities thereof prior to meshing of said clutch teeth.

4. In a constant-mesh variable speed power transmission mechanism, a power drive shaft, a splined actuating sleeve movable longitudinally on said shaft having a positive clutch element thereon, a series of independently rotatable gear members mounted in spaced relation around and longitudinally of the sleeve having internal teeth adapted for selective clutching with said positive clutch element to produce different speeds in the mechanism, an expandible annular member on the sleeve disposed on either side of said clutch element for frictionally and selectively precoupling said positive clutch element to each gear to synchronize the selected gear and clutch element, and actuable means in connection with the sleeve for moving the sleeve successively past said gear members to synchronize and clutch the selected gear member with the positive clutch element.

5. In a geared power transmission mechanism, a rotatable driving member mounted for axial sliding movement, a series of rotatable selectively driven members mounted coaxially with said driving member and spaced from each other in an axial direction, the driving member being formed with outwardly extending driving teeth and each of the driven members being formed with inwardly extending teeth complementary to said outwardly extending teeth on the driving member, the inner ends of which teeth on the driven members are concentric with the axis of the driving member whereby the driving member may engage with any one of the driven members to rotate the same, said driving members further having a compressible friction member adjacent the teeth on the driving member, said friction member having an outer surface concentric with the axis of the driving and driven member and slightly larger in diameter than the ends of the inwardly extending teeth of the driven members, whereby as the driving member is shifted axially the friction member will engage with the ends of the teeth on the selected driven member to synchronize the speed of the driving member and then the teeth of the driving member will positively engage the teeth on the selected driven member, said driving member being adapted to move successively past said driven members to synchronize the selected driven member.

6. In a constant-mesh variable speed power transmission, a drive shaft and a series of successive coaxial transmission gear members provided with internal clutch teeth adapted to be connected to said shaft for different speeds, a cooperating axially movable clutch member mounted on said shaft disposed interiorly of the internal clutch teeth and having clutch teeth adapted to successively mesh with the clutch teeth on the selected gear member in the series, and slotted, yieldable means mounted on the clutch member providing a resilient friction surface on one of said members positioned to initially yieldingly and frictionally preengage a surface on the clutch teeth of said other member to synchronize the angular velocities of said members prior to meshing said clutch teeth, said resilient friction surface being movable out of clutching engagement to inoperative position upon subsequent meshing of said clutch teeth, said slidable clutch member being adapted to move longitudinally past one selected gear member to another in the series for varying speed.

LEOPOLD SCHMID.

REFERENCES CITED

The following references are of record in the file of this patent:

UNITED STATES PATENTS

| Number | Name | Date |
| --- | --- | --- |
| 1,511,232 | Murray | Oct. 24, 1924 |
| 1,828,508 | Murray | Oct. 20, 1931 |
| 1,924,875 | Murray | Aug. 29, 1933 |
| 1,957,416 | Weydell | May 1, 1934 |
| 2,048,883 | Murray | July 28, 1936 |
| 2,416,154 | Chilton | Feb. 18, 1947 |